United States Patent
Chen

(10) Patent No.: US 10,211,869 B2
(45) Date of Patent: Feb. 19, 2019

(54) CARD TRAY HAVING A BOLT JOINING FLOATINGLY A FRONT DOOR AND A REAR TRAY PORTION

(71) Applicant: FOXCONN INTERCONNECT TECHNOLOGY LIMITED, Grand Cayman (KY)

(72) Inventor: Chin-Yu Chen, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/873,173

(22) Filed: Jan. 17, 2018

(65) Prior Publication Data
US 2018/0205408 A1    Jul. 19, 2018

(30) Foreign Application Priority Data
Jan. 17, 2017    (CN) .......................... 2017 1 0034781

(51) Int. Cl.
| | | |
|---|---|---|
| *H05K 5/00* | (2006.01) | |
| *H04B 1/3816* | (2015.01) | |
| *H04M 1/02* | (2006.01) | |

(52) U.S. Cl.
CPC ........... *H04B 1/3816* (2013.01); *H04M 1/026* (2013.01)

(58) Field of Classification Search
CPC .... H04M 1/026; H05K 5/0269; H04B 1/3816

USPC ................................................. 361/737, 752
See application file for complete search history.

(56) References Cited

U.S. PATENT DOCUMENTS

| | | | | |
|---|---|---|---|---|
| 9,077,109 B1* | 7/2015 | Lin | .................... | G06K 13/0812 |
| 9,236,681 B2* | 1/2016 | Yu | ...................... | H01R 13/5219 |
| 9,658,641 B2 | 5/2017 | Stephens | | |
| 2013/0237086 A1* | 9/2013 | Chang | ................... | H01R 13/46 |
| | | | | 439/374 |
| 2013/0240629 A1* | 9/2013 | Pesonen | ............... | H04B 1/3816 |
| | | | | 235/486 |
| 2013/0334948 A1* | 12/2013 | Chung | ................ | H05K 7/1461 |
| | | | | 312/333 |
| 2014/0363995 A1* | 12/2014 | Shimada | .............. | G06K 13/085 |
| | | | | 439/327 |

FOREIGN PATENT DOCUMENTS

| | | |
|---|---|---|
| CN | 107204541 A | 9/2017 |
| TW | M471068 | 1/2014 |
| TW | M52248 | 5/2016 |

* cited by examiner

*Primary Examiner* — Hung S. Bui
(74) *Attorney, Agent, or Firm* — Wei Te Chung; Ming Chieh Chang

(57) ABSTRACT

A card tray for an electronic device having a housing includes: a front door having an outer face and being adapted to be received in a slot opening of the housing; a rear tray portion configured to support an electronic card; and a bolt joining a rear end of the door and a front end of the tray portion together floatingly.

10 Claims, 6 Drawing Sheets

CARD TRAY HAVING A BOLT JOINING FLOATINGLY A FRONT DOOR AND A REAR TRAY PORTION

BACKGROUND OF THE INVENTION

1. Field of the Invention

The present invention relates to a card tray for a card connector and more particularly to a card tray having a front door and a rear tray portion that are coupled in a floating manner so as to allow a movement relative to each other.

2. Description of Related Arts

Taiwan Patent No. 471068 discloses a card tray having a front door, a rear tray portion, and a pair of pins for fixedly fastening the door to the tray portion. The card tray is to be inserted into a card connector for use with a portable electronic device which includes a housing having a slot opening for seating the door.

U.S. Pat. No. 9,658,641 discloses a cosmetically self-centering removable module tray having a tray portion, a door or external portion, and a flexible portion interfacing between the tray portion and the external portion. In some embodiments, a dovetail feature can form an interface between tray portion and external portion. Tray portion can also join external portion by utilizing a number of joints. Joint can substantially limit movement of tray portion and external portion relative to each other in x and y directions; however, joint can allow the positions of tray portion and external portion to float relative to each other in z direction.

SUMMARY OF THE INVENTION

A card tray for an electronic device having a housing comprises: a front door having an outer face and being adapted to be received in a slot opening of the housing; a rear tray portion configured to support an electronic card; and a bolt joining a rear end of the door and a front end of the tray portion together floatingly.

DETAILED DESCRIPTION OF THE PREFERRED EMBODIMENT

Figure 1:
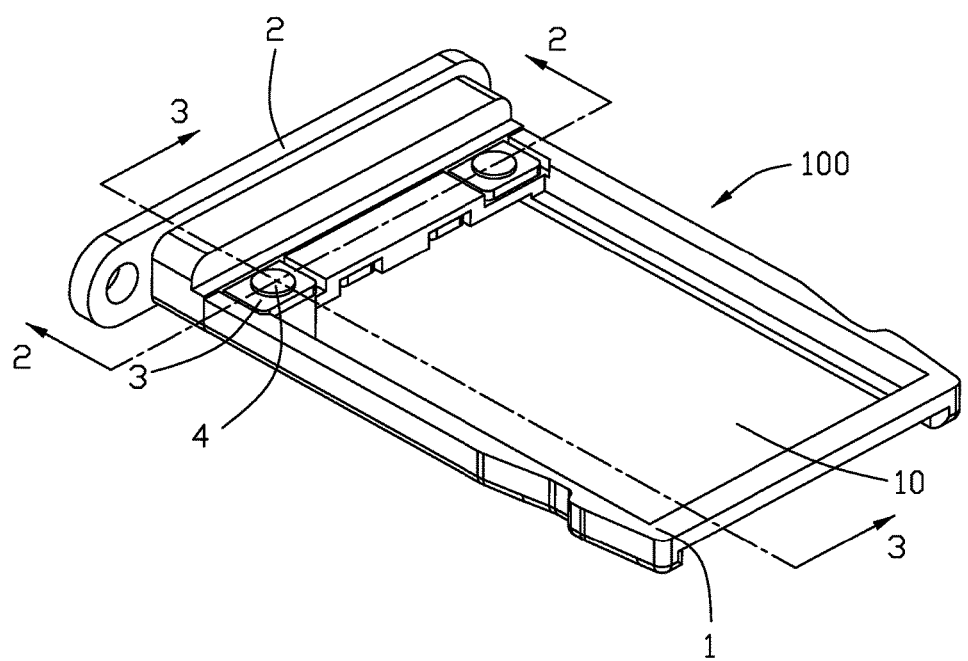
FIG. 1 is a perspective view of a card tray in accordance with the present invention.

Referring to FIGS. 1-6, a card tray 100 for accommodating one or more electronic cards is to be connected to an electrical connector in an electronic device and comprises a front door, a rear tray portion 1, and a pair of bolts or posts 4 joining a rear end of the door to a front end of the tray portion together in a floating manner, i.e., allowing a floating movement of the door relative to the tray portion. The door has an insulative front part 2 and a metallic piece 3 secured to the insulative front part 2. The metallic piece 3 extends outwardly of the insulative front part 2 to form the rear end of the door.

Figure 5:
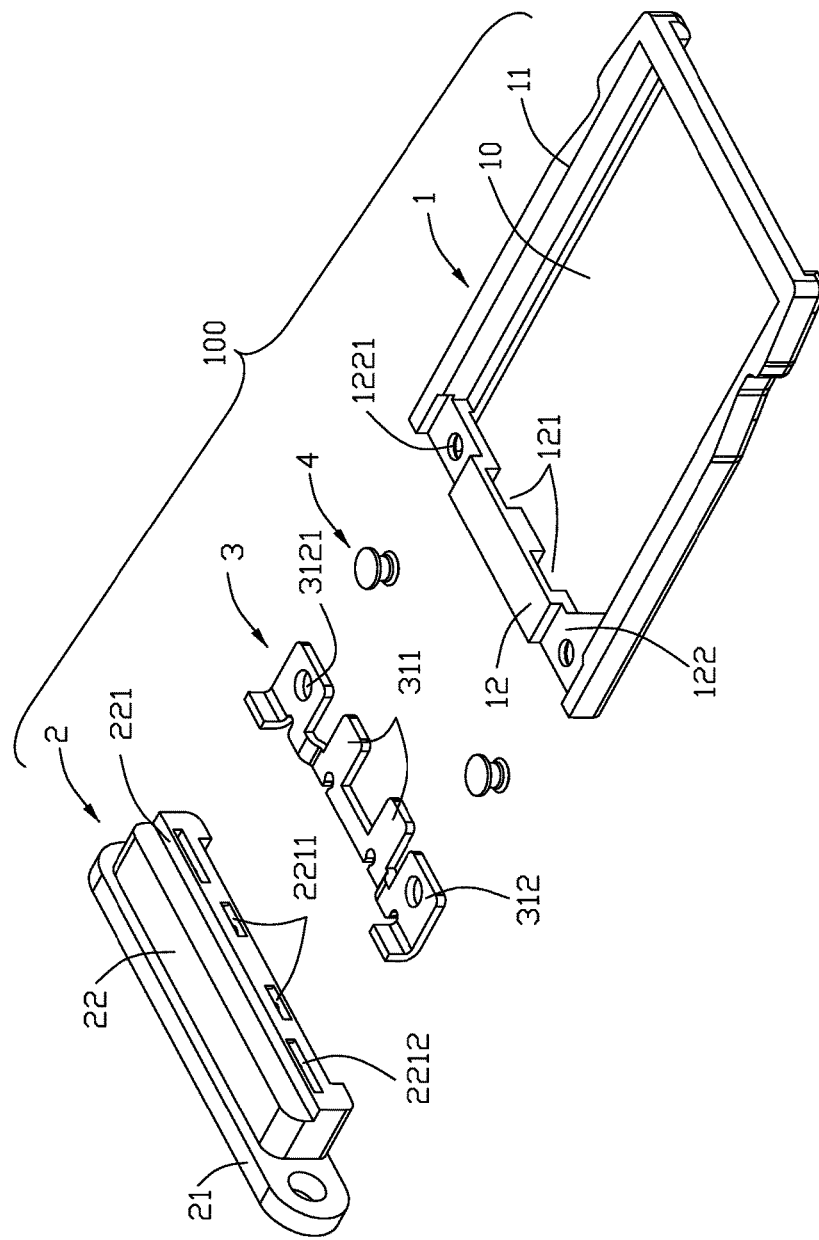
FIG. 5 is a further exploded view of the card tray.
Figure 6:
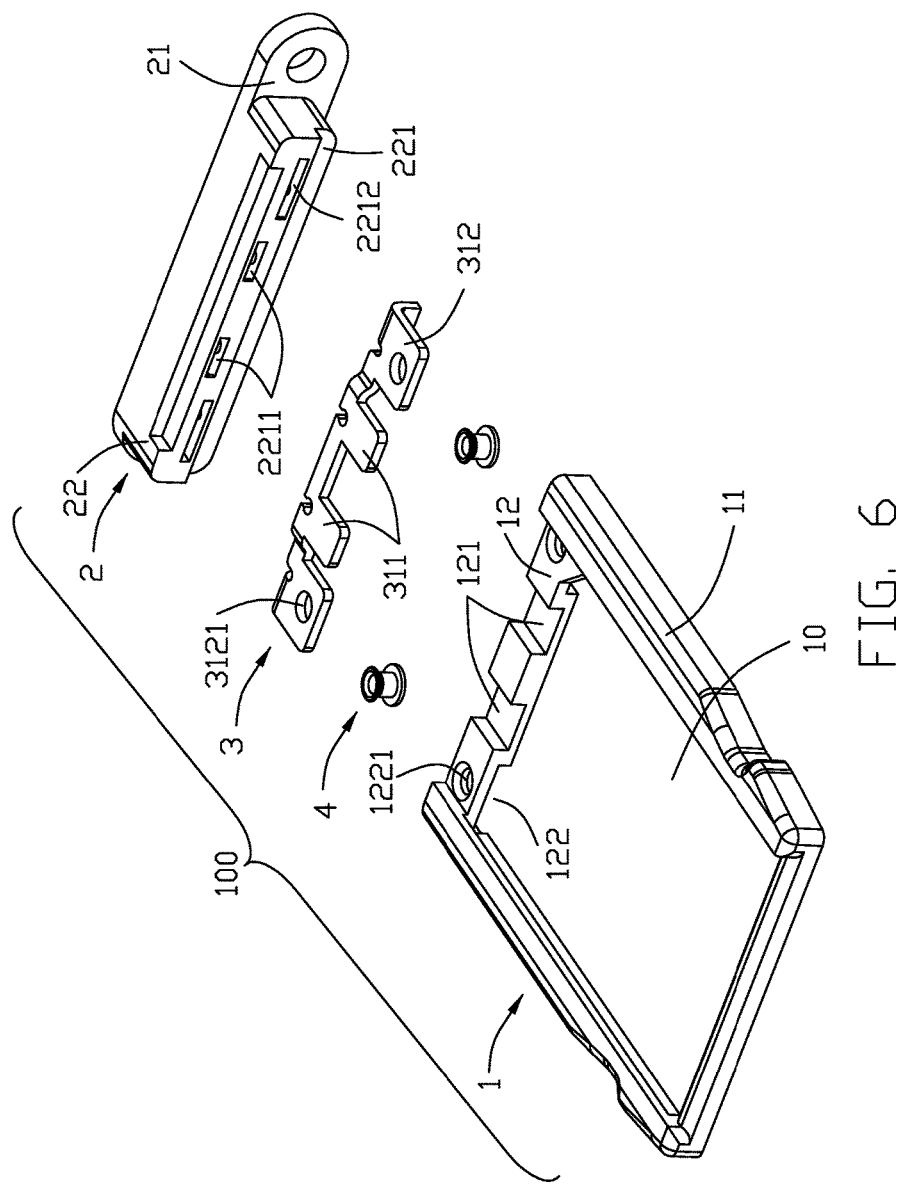
FIG. 6 is a view similar to FIG. 5 but from a different perspective.

Referring to FIGS. 5 and 6, the insulative front part 2 has a hand-gripping face plate or front part 21 and a rear block 22. The rear block 22 has a step 221 with grooves 2211 and 2212.

Figure 4:
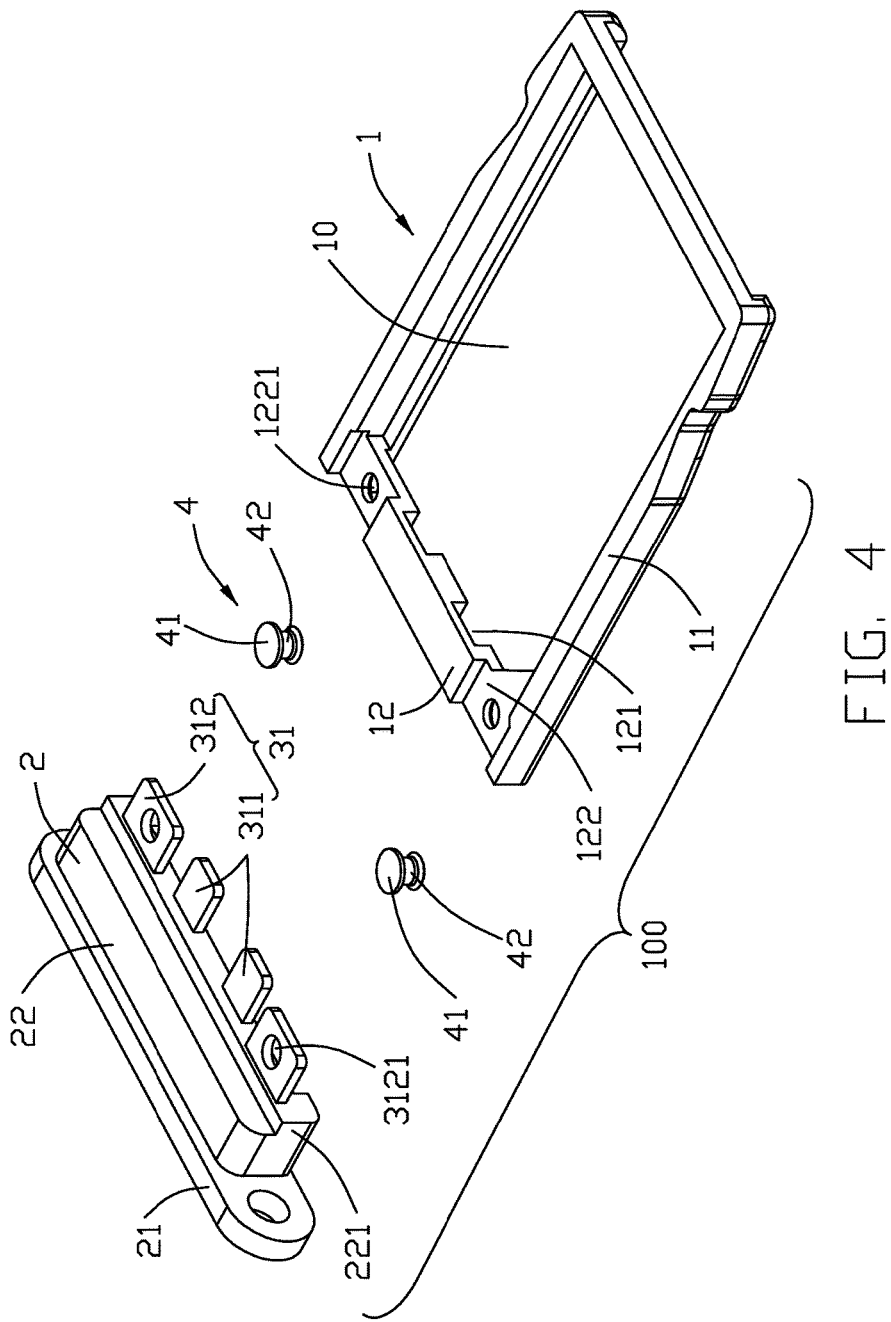
FIG. 4 is an exploded view of the card tray.

Referring to FIGS. 4-6, the metallic piece 3 is insert-molded with the insulative front part 2 and has one or more legs 31. The legs 31 may include a pair of middle legs 311 and a pair of side legs 312. Each of the pair of legs 312 has a hole 3121.

Referring to FIGS. 1 and 4-6, the tray portion 1 is made of metals and has a frame 11 surrounding a receiving space 10. The frame 11 includes a front beam 12 having a pair of first regions 121 facing downward for accommodating the pair of middle legs 311 and a pair of second regions 122 facing upward for accommodating the pair of side legs 312. Each of the pair of second regions 122 has a hole 1221 aligned with the hole 3121 of the side leg 312. The bolt 4 extends through the holes 3121 and 1221 and is then riveted in such a way that the bolts 4 join the legs 312 of the metallic piece 3 and the regions 122 of the tray portion 1 together floatingly, i.e., allowing the positions of the metallic piece 3 of the door and the tray portion 1 to float relative to each other.

Figure 2:
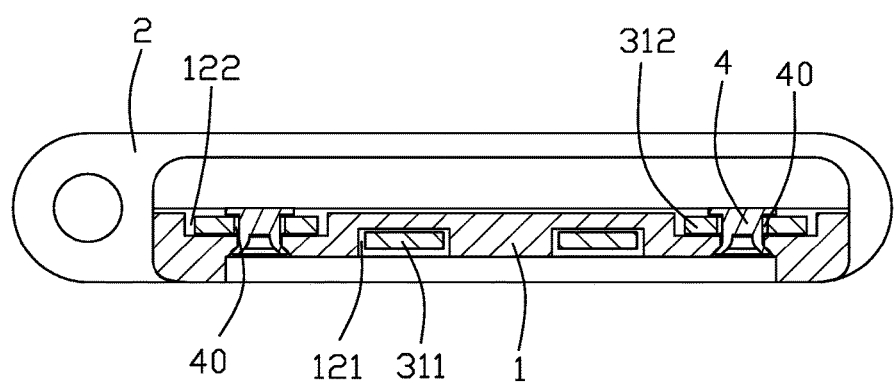
FIG. 2 is a cross-sectional view of the card tray taken along line 2-2 in FIG. 1.
Figure 3:
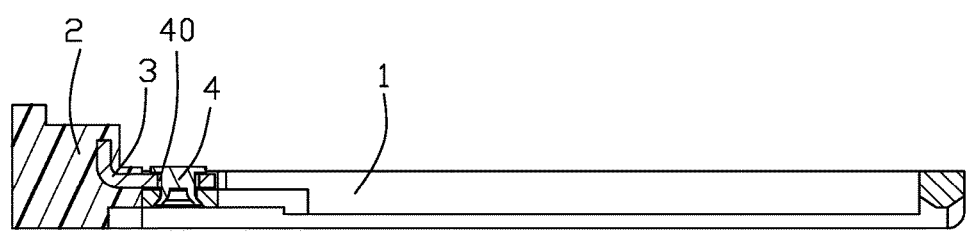
FIG. 3 is a cross-sectional view of the card tray taken along line 3-3 in FIG. 1.

Referring to FIGS. 2-4, the bolt 4 has a head 41, a body 42, and a riveting end. A gap 40 exists between the body 42 and the hole 3121 of the side leg 312 for a relative movement therebetween in x and y directions. Moreover, since the side leg 312 is not fixedly (immovably) fastened to the region 122 of the tray portion 1, a relative movement in z direction is also allowed. It can be understood that using a pair of bolts 4 respectively located by two sides of the center line of the card tray can have the operation more balanced compared with using only one bolt at the center line. In other words, using two floating points arrangement may avoid the possible tilting due to the single point floating.

What is claimed is:

1. A card tray for an electronic device having a housing, comprising:
   a front door having an outer face and being adapted to be received in a slot opening of the housing;
   a rear tray portion configured to support an electronic card; and
   a bolt joining a rear end of the door and a front end of the tray portion together floatingly; wherein
   the door comprises an insulative front part and a metallic piece containing the rear end thereof.

2. The card tray as claimed in claim 1, wherein there are provided a pair of bolts coupling the rear end of the door and the front end of the tray portion together floatingly.

3. The card tray as claimed in claim 1, wherein the metallic piece has a first leg and a second leg gripping the front end of the tray portion.

4. The card tray as claimed in claim 1, wherein the metallic piece is insert-molded with the insulative front part.

5. The card tray as claimed in claim 1, wherein the rear tray portion is metallic.

6. The card tray as claimed in claim 1, wherein each of the rear end of the door and the front end of the tray portion has a hole, and the bolt extends through the holes and is riveted.

7. A card tray for an electronic device having a housing, comprising:
   a front door having an outer face and being adapted to be received in a slot opening of the housing; and a rear tray portion configured to support an electronic card; wherein a rear end of the front door is configured and dimensioned to be assembled to a front end of the rear tray without a relative movement along a front-to-back direction while having a floatable relative movement therebetween in a vertical direction perpendicular to said front-to-back direction;

the floatable relative movement is made via at least one post which is retained to the rear tray and extends through at least one hole in the door;

said post is secured to the rear tray without a relative movement therebetween in the vertical direction and the front-to-back direction; and said front door includes an insulative front part and a metallic piece securely attached to a rear side of the front part, and the hole is formed in the metallic piece.

8. The card tray as claimed in claim 7, wherein there are a pair of said posts received in corresponding two holes in a floatable manner in the vertical direction.

9. The card tray as claimed in claim 8, wherein said pair of posts are located symmetrically with regard to a front-to-back center line of the card tray in a transverse direction perpendicular to said front-to-back direction and said vertical direction.

10. A card tray for an electronic device having a housing, comprising:

a front door having an outer face and being adapted to be received in a slot opening of the housing along a front-to-back direction;

a rear tray portion configured to support an electronic card; and a bolt joining a rear end of the door and a front end of the tray portion together floatingly to allow a relative movement between the door and the tray portion in the front-to-back direction, a transverse direction perpendicular to the front-to-back direction, and a vertical direction orthogonal to the front-to-back direction and the transverse direction.

* * * * *